Nov. 24, 1959    A. L. LYTLE    2,913,983
ROCKET MOTOR
Filed Nov. 29, 1954
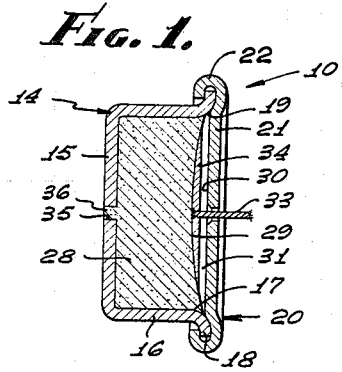
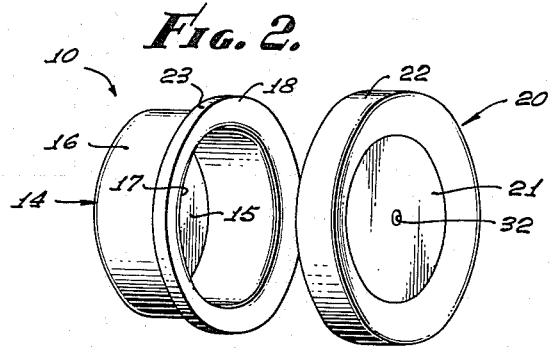
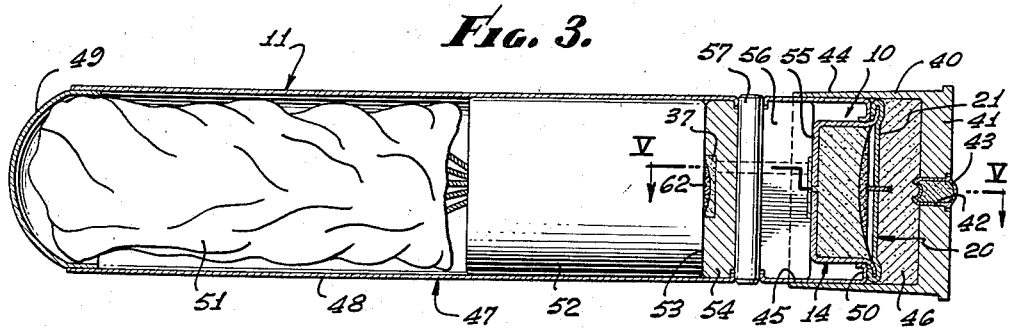
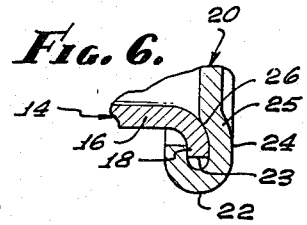
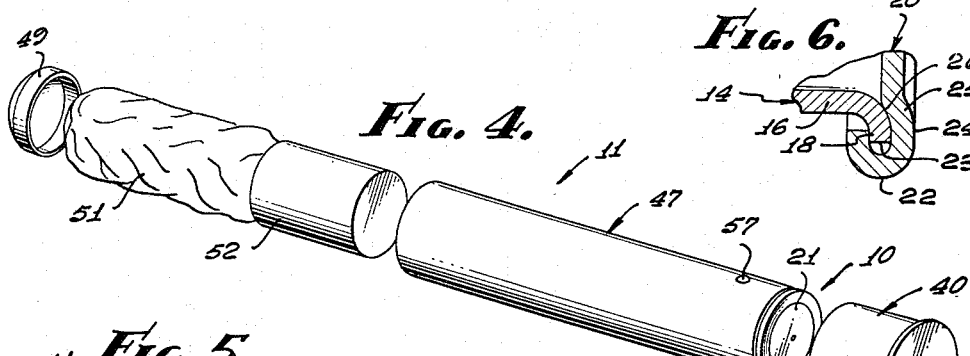
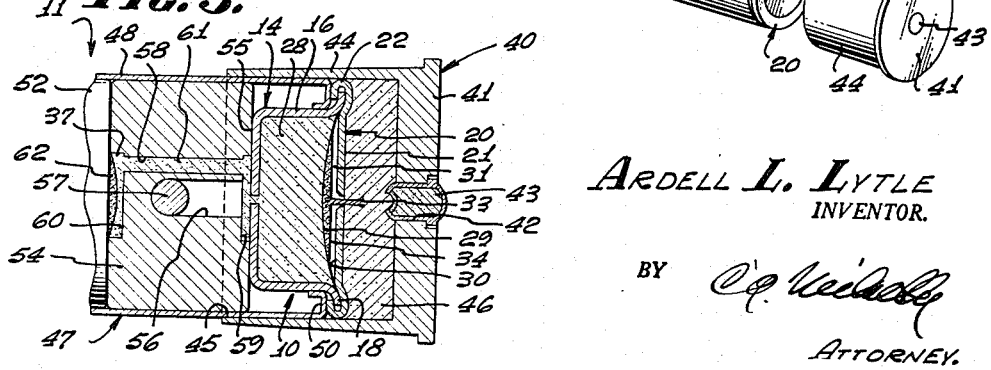
ARDELL L. LYTLE
INVENTOR.
BY
ATTORNEY.

United States Patent Office 2,913,983
Patented Nov. 24, 1959

2,913,983

ROCKET MOTOR

Ardell L. Lytle, Pacoima, Calif.

Application November 29, 1954, Serial No. 471,669

2 Claims. (Cl. 102—35.6)

This invention relates to rocket motors and more particularly to a rocket motor for use in aerial pyrotechnic signal devices, signal flares, smoke flares, weapons, and devices for throwing life-saving lines, such as a rope or cord, a relatively great distance.

Aerial signal devices have included projectile means associated with a cartridge case having a powder charge for firing a projectile body to a selected altitude or range. Such prior proposed devices adapted to be fired from a hand-held pistol have been limited in altitude or range for several reasons. Prior hand-held pistols were relatively heavily constructed to withstand the shock of the explosion of the powder charge in the cartridge when the pistol is fired. The weight and size of the pistol were limited to that which could be readily handled under conditions of maximum powder charge for maximum range.

This invention contemplates a simply constructed lightweight rocket motor for use with such an aerial projectile means which is set off by firing of a pistol or other means for propelling a projectile body to a pre-selected height having an altitude or range greatly exceeding prior proposed aerial signal devices.

It is therefore the primary object of this invention to disclose and provide a novel rocket motor for use with projectile means such as signal flares and the like, for selectively increasing the altitude or range of such a projectile.

An object of this invention is to disclose and provide a lightweight simply constructed rocket motor.

Another object of this invention is to disclose and provide a rocket motor which is easily and inexpensively manufactured and assembled and which may be made without precise machining or close working tolerances.

Another object of this invention is to disclose a novel rocket motor wherein the body parts thereof may be made on a punch press.

A further object of this invention is to disclose and provide a rocket motor which comprises a cup-shaped body having an outturned body flange and a cover having a cylindrical flange crimped over and interlocked with the body flange, said cover serving as a nozzle plate provided with a nozzle or orifice.

A still further object of this invention is to disclose and provide a rocket motor wherein a hollow motor body and nozzle plate cover are secured together and sealed by interlocking crimped flanges and wherein a solid propellent charge is contained within the motor body with expansion space provided therefor to serve as a combustion or burning chamber.

The invention contemplates a rocket motor as above described wherein a starter mixture for the propellent charge in the motor body is pressed into the surface of the propellent charge.

Another object of this invention is to disclose a rocket motor as above described wherein a nozzle plate cover is provided with an annular section of metal so disposed as to reinforce the cover against pressures developed in the motor and to provide an effective seal under such pressure with the rocket motor body.

A still further object of this invention is to disclose and provide a rocket motor which permits an initial powder charge employed in a cartridge case for a projectile means to be reduced to a minimum, and to thereby provide a relatively lightweight projectile means having a relatively greatly increased selective altitude or range.

Generally speaking, a projectile means employing a novel rocket motor of this invention includes a cartridge case containing a relatively small powder charge and adapted to be fired by well-known pistol means. Inserted into the open end of the cartridge case is a projectile body. Fitted within the said end of the projectile body is a rocket motor embodying this invention, said rocket motor including a fuse to be ignited by the powder charge in the cartridge case for setting off a rocket propellent charge carried within the rocket motor. The rocket charge is connected by a second fuse means to an expellant charge, for ejecting the flare device at the end of the rocket thrust.

Other objects and advantages of this invention will be readily apparent from the following description of the drawings.

In the drawings:

Fig. 1 is a sectional view of a rocket motor embodying this invention in assembled form and taken in a plane passing through the axis of the motor.

Fig. 2 is a perspective exploded view of the rocket motor shown in Fig. 1 and without the propellent charge therein.

Fig. 3 is a longitudinal sectional view of a projectile means utilizing the rocket motor of this invention.

Fig. 4 is an exploded view of the projectile means shown in Fig. 3.

Fig. 5 is an enlarged sectional view taken in the plane indicated by line V—V of Fig. 3.

Fig. 6 is an enlarged fragmentary sectional view showing crimped interlocked engagement of the cover of the rocket motor with cup-shaped body thereof.

A rocket motor embodying this invention, generally indicated at 10, is shown in Figs. 1, 2 and 6. Rocket motor 10 may be employed in various types of projectile means. In the example described and illustrated, a rocket motor 10 may be included in a projectile means, generally indicated at 11, which may be used for aerial signal means of different types.

Rocket motor 10 may comprise a cup-shaped hollow motor body member 14 made of any suitable metal material such as a hot-rolled, untreated drawn steel. The metal material does not require special alloys or special treatment. The body 14 may be readily formed as by pressing and drawing the metal on a suitable punch press. The body member 14 includes a transverse bottom wall 15 and an integral cylindrical side wall 16. Side wall 16 may be of any selected length depending upon the amount of rocket propellent charge 28 desired to be held or contained therewithin to achieve a preselected altitude or range. Side wall 16 defines an opening 17 and the adjacent end marginal portion of side wall 16 may be radially outwardly turned about a selected radius so as to provide an integral body flange 18. Flange 18 has a circumferential edge margin 23 lying in a plane perpendicular to the axis of the motor and said radius is sufficient so that a relatively gentle curve 19 joins the internal surface of the wall 16 and said edge margin. The metal section of bottom wall 15, side wall 16, and flange 18, may be substantially uniform.

A rocket motor cover member 20 is provided to close opening 17 and may be similarly made as by a punch press of any suitable material such as an untreated, hot-roll drawn steel. The metal section of cover 20 may be uniform and may be approximately the same thickness as that of body member 14. Cover member 20 serves as a rocket motor nozzle plate and includes a central circular plate 21, integrally formed with a peripheral cylindrical cover flange 22 extending in one direction away from said plate 21. Flange 22 has an internal diameter slightly greater than the external diameter of circumferential edge 23 of body flange 18. Flange 22 is joined to plate 21 by an annular portion 24 and an inwardly flaring inclined metal section 25. The annular inwardly flaring metal section 25 serves to strengthen and reinforce the circular plate 21. The plane of the plate 21 is spaced inwardly from a parallel plane which passes through the external surface of annular portion 24.

Cover member 20 is assembled with body member 14 by first sleeving cover flange 22 over body flange 18 and then inwardly turning and tightly crimping flange 22 thereover to irreleasably interlock said flanges 18 and 22. When the crimping operation is completed, cover member 20 is firmly secured on the body member 14, and a relatively wide annular area of surface contact at 26 is provided between metal section 25 and surface 19. This wide annular area of surface contact which extends inwardly of the body member serves to provide an effective seal against pressures developed in the rocket motor.

If desired, a suitable cementing compound, not shown, may be interposed between contacting surfaces of flanges 22 and 18, prior to the crimping operation, so that an extremely tight adhesive seal is provided around the crimped edge of the rocket motor.

Within body member 14 and before cover member 20 is applied thereto, may be pressed a suitable selected solid rocket propellent charge 28. Filling of body member 14 with charge 28 under pressure eliminates inclusion of air in the charge. Propellent charge 28 may be provided with a concave spherical surface 29 for maximum burning area. Surface 29 is spaced from internal surface 30 of nozzle plate 21 to provide space for expansion of gases when the charge 28 is burned, said space affording an explosion or combustion chamber 31 for the rocket motor.

Plate 21 of cover member 20 is provided with a nozzle 32 at the center thereof and aligned with the axis of the rocket motor. Nozzle 32 may be simply formed by drilling a bore of a suitable selected diameter through plate 21 to provide an orifice. An exemplary diameter of a bore may be $\frac{1}{16}$ of an inch. If desired, the orifice forming the nozzle 32, may be uniform in diameter throughout its length or the inner end of the orifice may be provided with outwardly flared surfaces as by counterboring.

A suitable fuse 33 may be inserted through nozzle 32, the inner end of said fuse being embedded in a suitable igniting or starter mixture 34 for firing the rocket propellent charge 28. The starter mixture 34 is pressed into the rocket charge 28 over a substantial portion of the concave surface 29. The bottom wall 15 of the body member 14 may be provided with an axial port 35 for a fuse 36 ignitable by propellent charge 28 for firing of an expellant charge 37 to eject signal flare means from the projectile means 11.

The projectile means 11 (Figs. 3, 4 and 5) may comprise an integral cartridge case 40 having a relatively thick section base wall 41 provided with a central port 42 within which may be inserted a suitable firing cap or detonator means 43. The case 40 also includes cylindrical tapered side walls 44 terminating in an open end 45. The cartridge case 40 provides a chamber for a powder charge 46 for initially propelling a projectile body 47 from case 40.

The projectile body 47 includes an elongated, hollow, open-ended tube 48 of light metal provided with a cap 49 sleeved in one end and having an inturned, annular internal flange 50 at its other end. Flange 50 provides an annular seat for the crimped interlocked flanges of rocket motor 10. The opening defined by annular flange 50 snugly receives therewithin the cylindrical side wall 16 of the body member 14 of the rocket motor.

Within tube 48 may be folded a parachute 51 connected to signal or flare means 52 in well known manner. The flare means 52 may be seated at 53 against one end of a cylindrical plug 54 of any suitable material such as wood. The plug 54 may be provided a seat at 55 at its other end against bottom wall 15 of the rocket motor 10. The plug 54 may include a transverse slot 56 open at said other end for reception of a retaining pin 57. The retaining pin 57 is carried by aligned openings in the tube 48. Ends of the pin 57 may extend slightly beyond the external surface of the tube 48 for cooperative engagement with lands and grooves of a pistol to impart a twist to the projectile body when fired. The plug 54 may include an axially offset through bore 58 terminating at opposite ends in circular recesses 59 and 60 respectively, recess 59 being adjacent to rocket motor 10 and recess 60 being adjacent to flare means 52. The through bore 58 and recesses 59 and 60 carry fuse means 61 for communication with the solid rocket propellent 28 and an expellant charge 62 for ejecting the flare means from the tube 48 at a preselected time.

In operation it will be readily apparent that the projectile means 11 may be fired in a suitable firing device through the firing cap 43 which ignites powder charge 46 in the cartridge case 40. The powder charge 46 ignites fuse 33 and also ejects the projectile body 47 from the cartridge case and from the device, a spinning motion being imparted thereto as above described. After the projectile body 47 has been ejected from the firing device, the solid rocket propellent charge 28 is ignited by fuse 33 and the starter mixture 34. The burning of the propellent charge in the combustion chamber 31 produces combustion gases under high pressure and temperature which are ejected through the nozzle 32. Thrust imparted by the burning of the propellent charge imparts a velocity to the projectile body greater than its initial muzzle velocity. The rocket charge ignites fuse 61 and after a preselected time causes firing of expellant charge 62 which causes ejection of the flare means and parachutes from the tubular projectile body.

It will thus be readily apparent that the projectile means 11 may comprise a construction which requires a relatively small powder charge in order to initially impart a velocity to the projectile body and which eliminates the necessity for the relatively heavy construction of hand-held signal guns heretofore used. The ejected projectile body 47 is capable of achieving selected altitudes or ranges dependent upon the amount of charge provided in the rocket motor 10.

It should also be noted that the rocket motor 10 is very simply constructed but is yet capable of withstanding the high temperatures and gas pressures produced during burning of the rocket charge. It has been discovered that the crimping of the cylindrical flange of the cover member over the outturned flange of the motor body member will withstand the gas pressures within the rocket motor. The depressed cylindrical wall may be bowed slightly outwardly as a result of said pressures, however, the arrangement of the radially, inwardly inclined annular metal section which joins the cylindrical cover flange to the circular, nozzle plate reinforces the nozzle plate to resist the pressures developed by the rocket motor without loss of annular sealing contact of the crimped, interlocked flanges 18 and 22.

Those skilled in the art will readily recognize the provision of a novel rocket motor construction in the embodiment of this invention described above. It is important to note that the rocket propellent charge is carried in the rocket motor body and the metal of the rocket motor body serves as an inhibitor. Also, the rocket motor body includes expansion space for gases formed by burning of the propellent charge and provides a combustion chamber therefor. The concave, depressed surface on the rocket motor propellent charge provides a maximum area for burning of the charge and at the same time provides a convenient means for holding a starter mixture for the propellent charge, said starter mixture being pressed into the concave surface of the propellent charge. It is also important to note that the rocket motor comprises only two parts, a rocket motor body and a cover member for said body which serves as a nozzle plate for the rocket motor. While the nozzle plate on the cover member is illustrated as having a central nozzle axially aligned with the rocket motor, it will be understood that if desired, other nozzles may be made in the nozzle plate in any suitable selected arrangement so as to secure a desired flight of the projectile.

It will be understood by those skilled in the art that various modifications and changes may be made in the embodiment of this invention described above and all such modifications and changes coming within the scope of the appended claims are embraced thereby.

I claim:

1. In a projectile means including a cartridge case at one end and an ejectable flare means at the other end, the combination of: an elongated, hollow, open-ended projectile body provided with a releasable cover at one end for said ejectable means; a rocket motor inserted in the other end of the projectile body; a partition plug between said ends and providing a seat for said rocket motor and carrying an expellent charge at the other end for said ejectable means; pin means extending transversely through said partition plug and said projectile body, ends of said pin means extending beyond said projectile body adapted to engage rifling in a gun barrel; and time fuse means carried by the plug to interconnect said expellent charge with the rocket motor.

2. In a projectile means including an ejectable means and adapted to be fired from a gun barrel, the combination of: an elongated, hollow projectile body having an open end; a rocket motor inserted in said open end; partition means in said projectile providing a seat for the inner end of said rocket motor, said partition means carrying an expellent charge opposite to said rocket motor seat and provided with fuse means to interconnect said expellent charge and said rocket motor; and means to secure said partition means in said projectile body and including and extension projecting beyond the external surface of the projectile body for engagement with rifling in a gun barrel.

References Cited in the file of this patent

UNITED STATES PATENTS

| | | |
|---|---|---|
| 42,666 | Johnston et al. | May 10, 1864 |
| 1,313,801 | Doran | Aug. 19, 1919 |
| 1,318,720 | Bergman | Oct. 14, 1919 |
| 1,748,577 | Merriam | Feb. 25, 1930 |
| 1,947,834 | Driggs | Feb. 20, 1934 |
| 2,120,246 | Fischer | June 14, 1938 |
| 2,327,731 | McClary | Aug. 24, 1943 |
| 2,340,047 | Dunn | Jan. 25, 1944 |
| 2,362,534 | Brandt | Nov. 14, 1944 |
| 2,384,042 | O'Brien | Sept. 4, 1945 |
| 2,397,114 | Anzalone | Mar. 26, 1946 |
| 2,442,528 | Beattie | June 1, 1948 |
| 2,779,281 | Maurice et al. | Jan. 29, 1957 |

OTHER REFERENCES

Ser. No. 159,143, Zwerina (A.P.C.), published June 8, 1943.